(12) United States Patent
Moskowitz et al.

(10) Patent No.: US 6,654,588 B2
(45) Date of Patent: Nov. 25, 2003

(54) SYSTEM TO PROVIDE PRESENTATION EVALUATIONS

(75) Inventors: Paul A. Moskowitz, Yorktown Heights, NY (US); Clifford A. Pickover, Yorktown Heights, NY (US); William Grey, Millwood, NY (US); Stephen J. Boies, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 09/862,676

(22) Filed: May 22, 2001

(65) Prior Publication Data

US 2002/0177115 A1 Nov. 28, 2002

(51) Int. Cl.[7] .................................................. G09B 7/00
(52) U.S. Cl. ....................... 434/350; 434/323; 434/362; 709/231; 709/219
(58) Field of Search ................................ 434/350, 323, 434/362, 345, 302, 328; 706/927; 707/501, 502; 709/203, 204, 231, 219

(56) References Cited

U.S. PATENT DOCUMENTS 6,155,840 A * 12/2000 Sallette ........................ 434/350
2001/0048439 A1 * 12/2001 Young ......................... 345/473

* cited by examiner

Primary Examiner—Hieu T. Vo
(74) Attorney, Agent, or Firm—Buckley, Maschoff, Talwalkar & Allison; Stephen C. Kaufman (57) ABSTRACT

An alternative channel is provided for efficient communication between a presenter and audience members during a presentation. In one aspect, a presentation is presented to a plurality of audience members and an evaluation of the presentation is electronically received during the presentation. By virtue of this aspect, a presenter may be easily provided with adequate feedback, while the presentation is being presented, based on which a presentation may be tailored. The resulting presentation may therefore be more appealing to an audience member and more successful for the presenter.

11 Claims, 6 Drawing Sheets

SYSTEM TO PROVIDE PRESENTATION EVALUATIONS

BACKGROUND OF THE INVENTION

1. Field of the Invention

The present invention relates to presentation systems. Specifically, the present invention concerns presentation systems that enable audience members to provide feedback to a presenter.

2. Description of the Related Art

In a conventional presentation, information flows primarily from a presenter to audience members. Of course, audience members sometimes convey information to the presenter by applauding or by raising their hands in response to a query from the presenter. The audience members may also provide the presenter with formal or informal comments after the conclusion of the presentation. Nevertheless, conventional presentation systems fail to allow significant feedback from audience members, and therefore do not provide adequate information to a presenter regarding the impact of a presentation upon audience members.

Systems have recently been developed to gather more useful information from audience members. Often applied to political speeches, these systems operate by asking audience members to express their reactions to portions of a speech. The reactions may include approval, neutrality and disapproval, and may be expressed either manually or with an electronic device providing an interface for expressing such reactions. The reactions of the audience members are recorded and compiled to produce aggregated data. Political parties and/or analysts use the data to gauge the effectiveness of different aspects of a speech, such as content, form, style, delivery, etc. Although these recently-developed systems may provide more detailed information than previously available, the necessary delay in receiving the information is often unacceptable. Moreover, these systems do not provide for any direct communication between an audience member and a presenter.

In view of the foregoing, what is needed is a presentation system which provides improved communication between a presenter and audience members and which provides the communication in a cost-effective, simple and timely manner.

SUMMARY OF THE INVENTION

The present invention addresses the foregoing by providing an alternative channel for efficient communication between a presenter and audience members during a presentation. In one aspect, the invention includes presentation of a presentation to a plurality of audience members, and electronic receipt of an evaluation of the presentation during the presentation. By virtue of this aspect, a presenter may be easily provided with adequate feedback, while the presentation is being presented, based on which a presentation may be tailored. The resulting presentation may therefore be more appealing to an audience member and more successful for the presenter.

In another aspect, the present invention includes reception of a presentation from a presenter, and electronic transmission of an evaluation of the presentation to the presenter during the reception of the presentation. These features allow an audience member to efficiently provide information to a presenter during a presentation, thereby increasing the efficiency of the presentation.

In yet another aspect, the invention includes presentation of a presentation to a plurality of audience members, and electronic transmission of data to less than all of the plurality of audience members during the presentation. This aspect also increases efficiency of a presentation by allowing a presenter to transmit, during a presentation, information to select audience members.

With these and other advantages and features that will become hereafter apparent, a more complete understanding of the nature of the invention can be obtained by referring to the following detailed description and to the drawings appended hereto.

DETAILED DESCRIPTION

Figure 1:
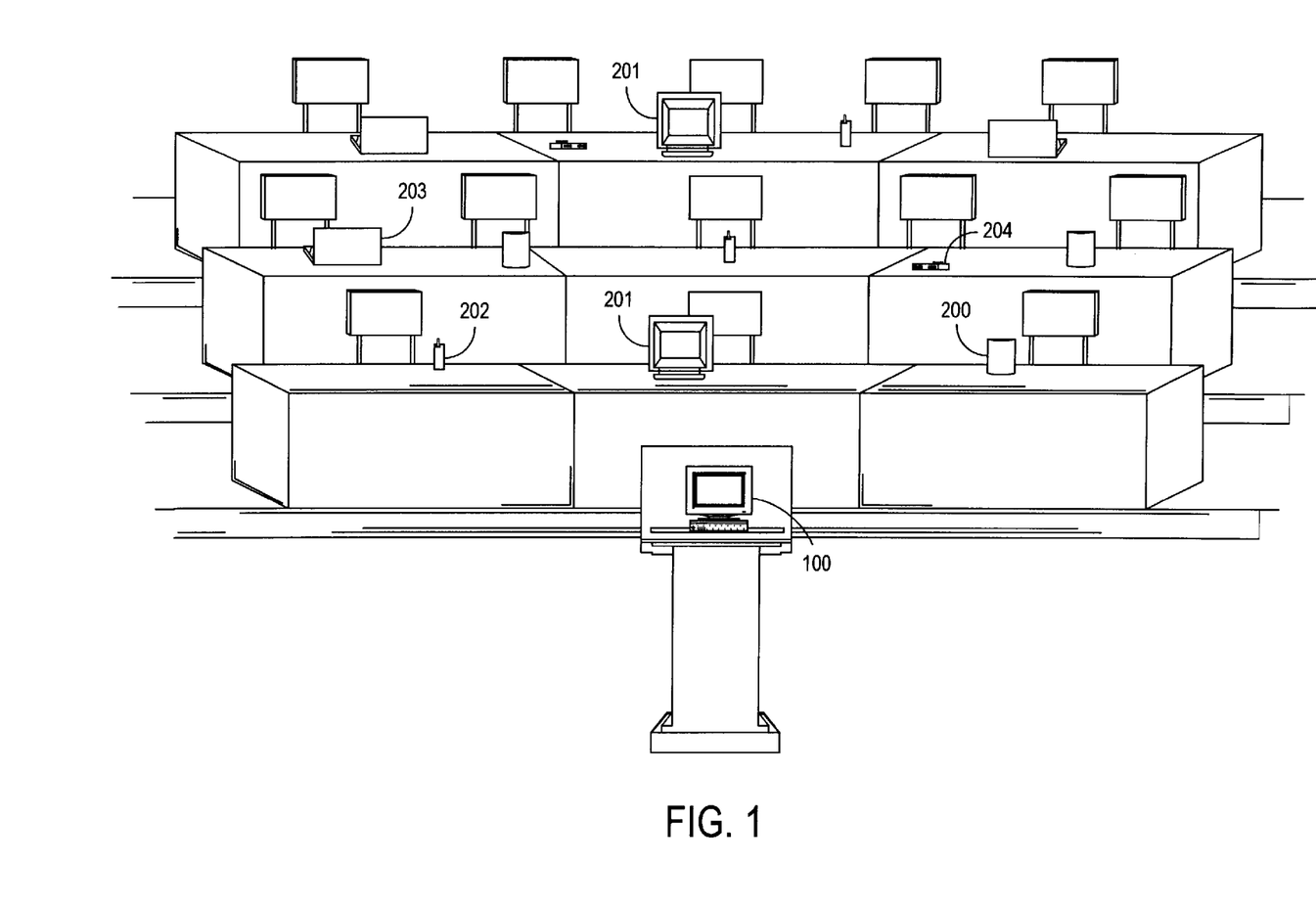
FIG. 1 is a view of a presentation environment according to some embodiments of the invention.

FIG. 1 is a representative view of a presentation environment according to some embodiments of the present invention. The environment may be located in a classroom, a conference room, a hall, an entertainment venue, or in any other location in which a presentation may be presented. FIG. 1 illustrates the environment from the perspective of a presenter.

In this regard, presenter device 100 faces the presenter during a presentation. Presenter device 100 may be a computer terminal used to present received evaluations to the presenter during a presentation and/or to electronically transmit information to less than all audience members during the presentation. It should be noted that, according to the present invention, presenter device 100 may comprise any device or devices capable or electronically receiving and transmitting data. Presenter device 100 may also be used to present the presentation. Particularly, presenter device 100 may execute a presentation software application such as Lotus® Freelance® in order to control a projector to project presentation slides onto a projection screen and/or in order to transmit presentation slides to audience devices 200 to 204.

Accordingly, audience devices 200 through 204 are in communication with presenter device 100. Audience devices 200 through 204 face chairs representing audience members, and respectively comprise a personal digital assistant (PDA), two computer terminals, a cellular telephone, a palmtop computer, and a hand-held entertainment device. In operation, audience devices 200 through 204 may electronically transmit an evaluation to a presenter during a presentation and/or receive data from a presenter during the presentation. Each of audience devices 200 through 204 may therefore comprise any combination of different devices capable of electronically transmitting and receiving data. Although no audience members or presenters are depicted in FIG. 1, it should be noted that any of devices 100 and 200 through 204 may be fixedly installed in the presentation environment or may be carried into the environment by an audience member or presenter.

Presenter device 100 and audience devices 200 through 204 may communicate using any number of systems for transferring data, including one or more of a local area network, a wide area network, a telephone network, a cellular network, a fiber-optic network, a satellite network, an infra-red network, a radio frequency network, such as a Bluetooth® or I.E.E.E. 802.11 wireless local area network, and any other type of network which may be used to transmit information between devices. Additionally, data may be transmitted using any known transmission protocol, such as Asynchronous Transfer Mode (ATM), Internet Protocol (IP) (in a network such as the Internet), Hypertext Transfer Protocol (HTTP) and Wireless Application Protocol (WAP).

According to one specific example, FIG. 1 depicts a classroom in which presenter device 100 and audience devices 201 are installed. Each other audience device shown in FIG. 1 is carried into the classroom by an audience member and is placed in a position to be used by the audience member. Next, devices 100 and 200 through 204 spontaneously create a wireless Bluetooth network for communication therebetween. Bluetooth networks will be described in greater detail with respect to FIG. 2.

Next, under control of a presenter, presenter device 100 executes a presentation application to project images onto a projection screen (not shown) using a projector (also not shown). The presenter speaks to the audience members as each successive image is projected. During this presentation, an audience member operates audience device 200 to transmit an evaluation of the presentation over the Bluetooth network to presenter device 100. In this example, the evaluation indicates that the presenter is not speaking loudly enough for the audience member to clearly hear the presentation. Presenter device 100 receives the evaluation and presents the evaluation to the presenter. The evaluation may be presented in any perceptible manner, including by displaying text and/or graphics, by emitting an audio signal, or by providing a tactile sensation.

In response to the received evaluation, the presenter may, during the presentation, operate presenter device 100 to transmit data to the audience member from whom the evaluation was received. Notably, such data might not be transmitted to other audience members. Accordingly, certain aspects of the present invention allow data to be transmitted from presenter device 100 to less than all of the audience members. Of course, the received evaluation may be anonymous, i.e., the presenter will not be able to determine the audience member from whom the evaluation was received.

In other examples, the received evaluation is an aggregation of evaluations transmitted by a plurality of the audience members. For instance, a plurality of audience members may transmit votes or ratings regarding the effectiveness of the presentation, with a vote tabulation or a composite rating being received by presenter device 100.

It should be noted that the invention is not limited to environments in which a presenter and all audience members are commonly located; rather, the invention may be used in environments including presenters and/or audience members located at one or more remote locations. In these embodiments, the devices may be networked using any networking protocol suitable for remote networking.

Network Architecture

Figure 2:
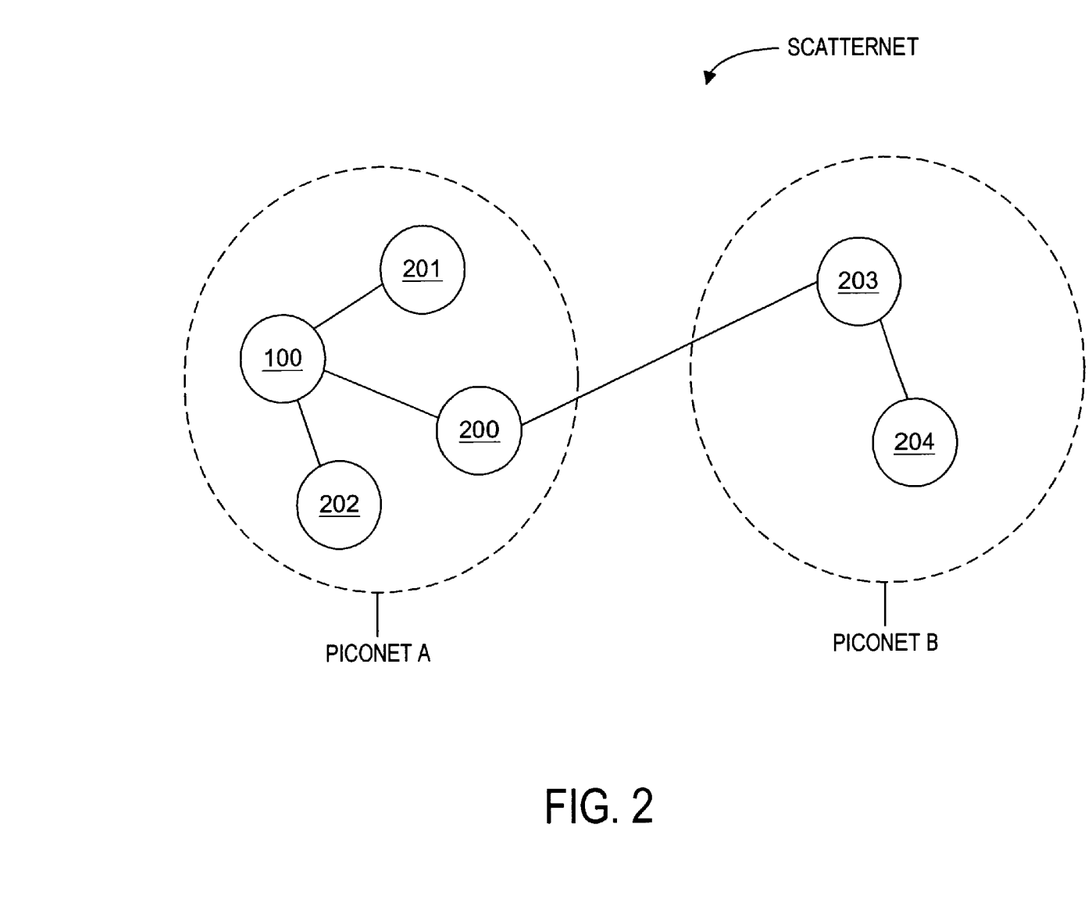
FIG. 2 is a topographic view of a network architecture according to some embodiments of the present invention.

FIG. 2 is a topographic view of a network architecture according to embodiments of the present invention. Particularly, FIG. 2 is a view of a Bluetooth scatternet architecture including piconet A and piconet B. Network architectures other that that shown in FIG. 2 and based on standards other than Bluetooth may be used to implement the invention.

Bluetooth refers to a global standard that allows a wide range of computing and telecommunication devices to be interconnected wirelessly. Each interconnected device may be equipped with a microchip transceiver that transmits and receives over a previously unused frequency band of 2.45 GHz that is available globally (with some variation of bandwidth in different countries). Accordingly, and unlike infrared devices, Bluetooth units are not limited to line-of-sight communication. In the embodiment of FIG. 1, each of devices 100 and 200 through 204 includes such a transceiver.

Bluetooth-enabled devices that come within range of each other can create an ad hoc point-to-point connection and/or an ad hoc point-to-multipoint connection. Devices connected according to one of these connections and synchronized to a same frequency-hopping sequence form a piconet, such as piconet A or piconet B. The particular distribution and arrangement of devices 100 and 200 through 204 within piconet A and piconet B illustrate merely one example of an ad hoc scatternet that may be created by these devices. It should be noted that although devices 100 and 200 through 204 are shown in communication with each other, the devices might not be constantly exchanging data.

As illustrated, several piconets can be established and linked together in ad hoc scatternets to allow communication and data exchange in flexible configurations. Each of such piconets operates independently and each has access to full bandwidth. To regulate traffic on a piconet, one of the participating devices becomes a master of the piconet and the other devices become slaves. Under the current Bluetooth specification, up to seven slaves can actively communicate with one master. However, using scatternets, almost an unlimited number of devices may be indirectly attached to a master and thereby able to start communication instantly.

The Bluetooth architecture illustrated in FIG. 2 is advantageous in the context of the present invention for several reasons. First, the ad hoc nature of a Bluetooth network allows networks to be easily established without significant planning and/or infrastructure. Additionally, devices can dynamically be added to or disconnected from a Bluetooth network. As a result, an audience member having a Bluetooth-enabled audience device may seamlessly join or withdraw from a Bluetooth network existing in the environment of FIG. 1.

Server

Figure 3:
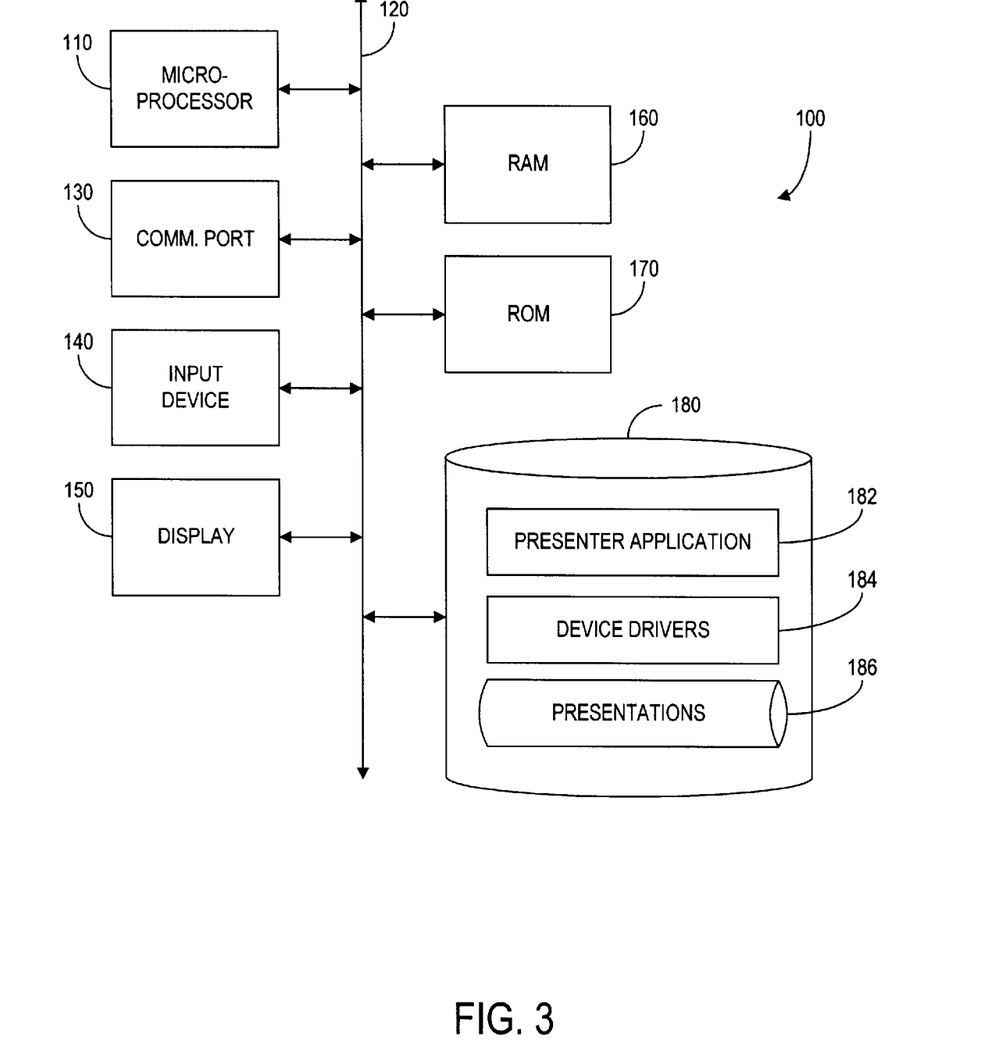
FIG. 3 is a block diagram of an internal architecture of a presenter device according to some embodiments to the present invention.

FIG. 3 is a block diagram of the internal architecture of presenter device 100 according to one embodiment of the invention. As illustrated, presenter device 100 includes microprocessor 110 in communication with communication bus 120. Microprocessor 110 may be a Pentium® or other type of processor and is used to execute processor-executable process steps so as to control the components of presenter device 100 to provide functionality according to embodiments of the present invention.

Also in communication with communication bus 120 is communication port 130. Communication port 130 is used to transmit data to and to receive data from devices external to presenter device 100 such as audience devices 200 through 204. Communication port 130 is therefore preferably configured with wired or wireless hardware suitable to physically interface with desired external devices and/or network connections. In some embodiments, evaluations are received and data is transmitted to audience devices 200 through 204 over communication port 130.

Input device 140 and display 150 are also in communication with communication bus 120. Any known input device may be used as input device 140, including a keyboard, mouse, touch pad, laser-pointing device, voice-recognition system, or any combination of these devices. Input device 140 may be used by a presenter operating presenter device 100 to input responses to received evaluations, to input commands for transmitting data to less than all audience members during a presentation, and/or to input commands to operate a presentation application executing in presenter device 100. Of course, such information may also be input to presenter device 100 via communication port 130. Display 150 may output text and graphics representing individual or aggregated evaluations received during a presentation, and may be an integral or separate CRT display, flat-panel display or the like.

In some embodiments, presenter device 100 includes other components for presenting received evaluations to a presenter. These components include speakers for emitting an evaluation in audio form and/or a vibrating element for providing a tactile sensation to the presenter. Of course, other components may be used to present a received evaluation to the presenter.

RAM 160 is connected to communication bus 120 to provide microprocessor 110 with fast data storage and retrieval. In this regard, processor-executable process steps being executed by microprocessor 110 are typically stored temporarily in RAM 160 and executed therefrom by microprocessor 110. ROM 170, in contrast, provides storage from which data can be retrieved but to which data cannot be stored. Accordingly, ROM 170 is used to store invariant process steps and other data, such as basic input/output instructions and data used during system boot-up or to control communication port 130. It should be noted that one or both of RAM 160 and ROM 170 may communicate directly with microprocessor 110 instead of over communication bus 120.

Data storage device 180 stores presenter application 182, device drivers 184 and presentations 186. Presenter application 182 comprises processor-executable process steps executed by microprocessor 110 in order to control presenter device 100 to present a presentation in accordance with the present invention. More specifically, the process steps of presenter application 182 may be executed by microprocessor 110 to present a presentation to a plurality of audience members, and to electronically receive an evaluation of the presentation during the presentation. As described above, these features provide a presenter with adequate information, while the presentation is being presented, based on which a presentation may be tailored. The resulting presentation may therefore be more appealing to an audience member and more successful for the presenter.

The process steps of presenter application 182 may also be executed by microprocessor 110 to present a presentation to a plurality of audience members, and to electronically transmit data to less than all of the plurality of audience members during the presentation. These features increase efficiency of a presentation by allowing a presenter to transmit, during a presentation, information to less than all of the audience members.

In addition to the foregoing, process steps of presenter application 182 may include process steps executable to assist in presenting a presentation. Such steps may include steps to control a projector to project slides onto a projection screen, to play audio or video clips, and to manipulate a pointer displayed on the projection screen.

The process steps of presenter application 182 may be read from a computer-readable medium, such as a floppy disk, a CD-ROM, a DVD-ROM, a Zip™ disk, a magnetic tape, or a signal encoding the process steps, and then stored in data storage device 180 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Device drivers 184 also comprise processor-executable process steps. The process steps may be executed by microprocessor 110 to allow presenter device 100 to interface with devices in communication with communication port 130. For example, device drivers 184 may include process steps executable to control a Bluetooth transceiver (not shown) to create a Bluetooth scatternet and to receive and transmit data over a Bluetooth network.

Presentations 186 include files used to present a presentation according to the invention. These files may include Freelance slide shows, audio, video and other media files. In some embodiments, presentations 186 include files in a format usable by presenter application 182 to present a presentation.

Data storage device 180 may also store other unshown elements that may be necessary for operation of presenter device 100 or to provide presenter device 100 with additional functionality. These elements, such as other applications, other data files, an operating system, and a database management application, are known to those skilled in the art and are therefore not described in detail herein.

Audience Device

Figure 4:
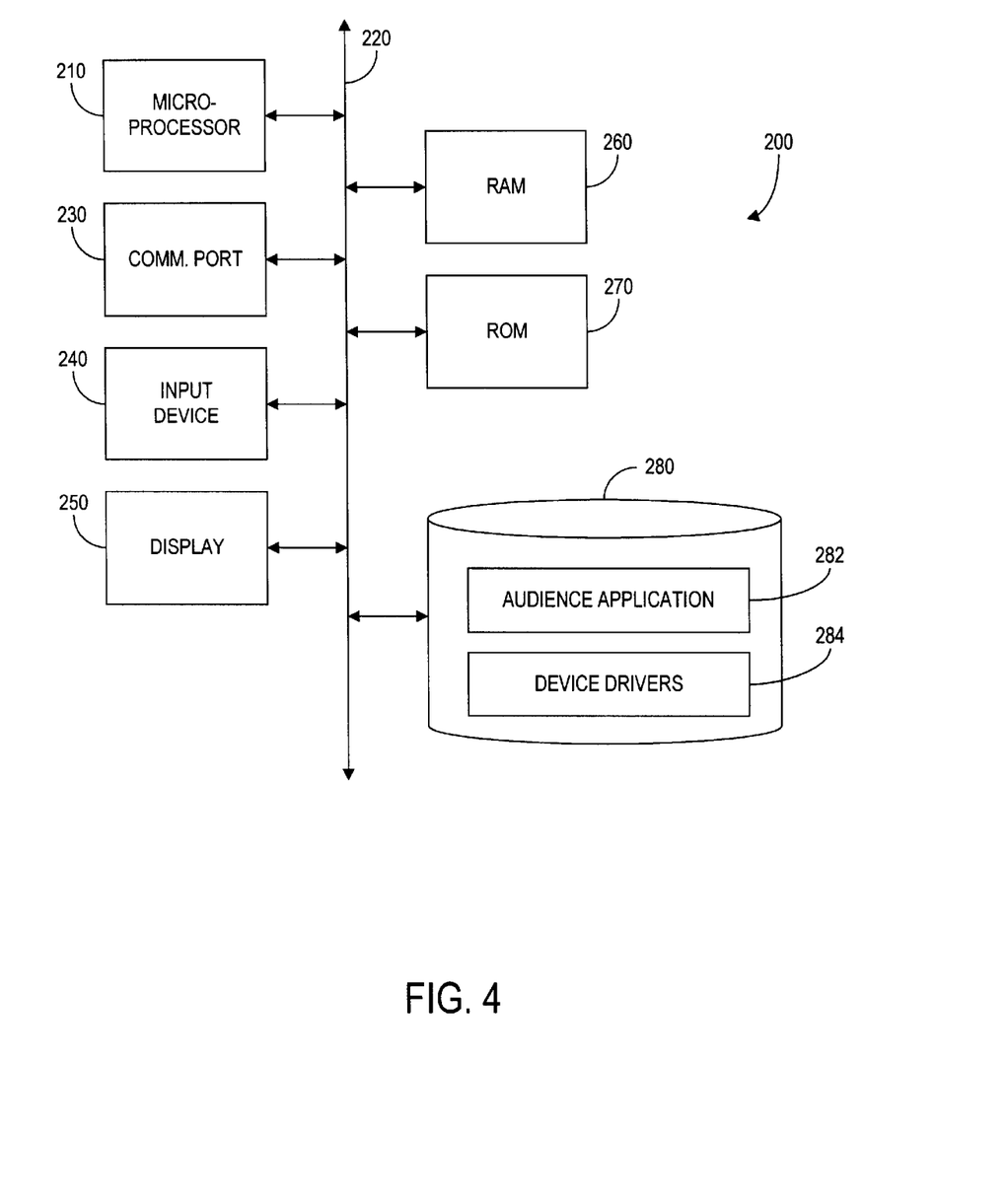
FIG. 4 is a block diagram of an internal architecture of an audience device according to some embodiments to the present invention.

FIG. 4 illustrates several components of audience device 200 according to one embodiment of the invention. The components may comprise any of the specific examples set forth above with respect to identically-named components of presenter device 100. Of course, specific functions performed by the components may differ from the functions performed by the identically-named components.

For example, microprocessor 210 may be used to execute processor-executable process steps to electronically transmit an evaluation of a presentation to a presenter during the presentation. In this regard, communication port 230 may be used to create a Bluetooth network, to transmit the evaluation to a presenter, and to receive data from the presenter in response to the evaluation. An audience member may operate input device 240 to create the evaluation and to input a command to transmit the evaluation during the presentation, and the response may be presented to the audience member by display 250. Of course, each of these components may be used to provide other functionality to the audience member in accordance with various applications executed by audience device 200.

Data storage device 280 stores processor-executable process steps of audience application 282. The process steps of audience application 282 may be executed by microprocessor 210 to receive a presentation from a presenter, and to electronically transmit an evaluation of the presentation to the presenter during the reception of the presentation. As described above, these features allow an audience member to easily provide information to a presenter during a presentation, thereby increasing the efficiency of the presentation.

Also stored in data storage device 280 are process steps of device drivers 284. The process steps of device drivers 284 may be executed by microprocessor 210 to control peripheral devices, such as a Bluetooth transceiver (not shown), to provide functionality in accordance with the present invention. Of course, data storage device 280 may also include applications and data necessary for providing the above functionality as well as other functionality to an audience member.

Processes

Figure 5:
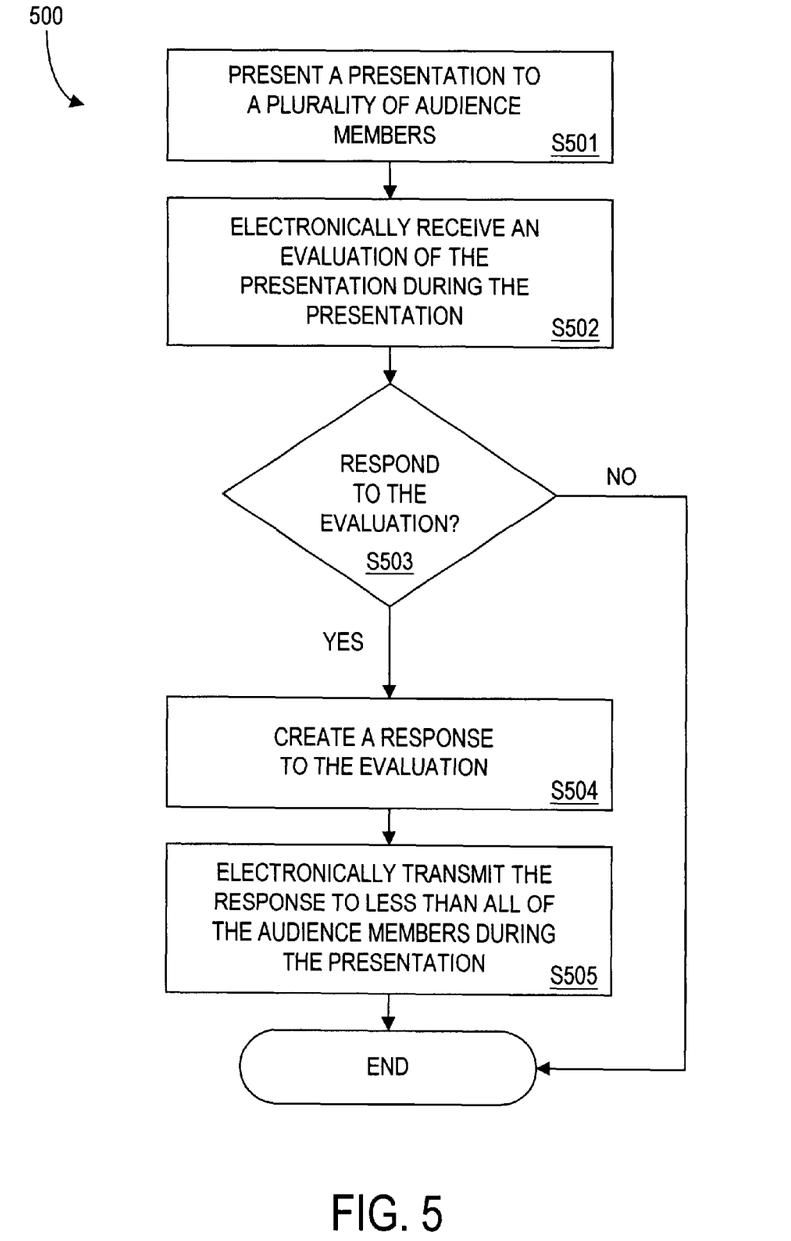
FIG. 5 is a flow diagram of process steps to present a presentation according to some embodiments of the present invention.

FIG. 5 sets forth process steps 500 to present a presentation according to some embodiments of the present invention. Process steps 500 are described herein as being included in presenter application 182 and executed by presenter device 100, however, it should be noted that various ones of process steps 500 may be included in device drivers 184 or in other applications and executed by any device or number of devices, and that some of process steps 500 may be performed manually.

Briefly, according to process steps 500, a presentation is presented to a plurality of audience members, and an evaluation of the presentation is electronically received during the presentation. Moreover, process steps 500 concern presentation of a presentation to a plurality of audience members, and electronic transmission of data to less than all of the plurality of audience members during the presentation.

Turning to process steps 500, a presentation is presented to a plurality of audience members in step S501. The presentation may be presented in a classroom, a professional meeting, a business meeting, a remote learning environment, a sporting event, an entertainment venue, and any other suitable forum. The presentation may include any number of elements for presenting information, including oral communication, recorded audio, music, video, and images. It should be noted that, according to this embodiment, the presentation continues throughout the remaining steps of process steps 500.

An evaluation of the presentation is electronically received in step S502. The evaluation may be received from any audience device in communication with presenter device 100. As mentioned above, communication between audience devices and presenter device 100 may be provided by any type of direct or network connection. The connection may be established without regard to the evaluation or may be established in response to a request to transmit/receive an evaluation. In some embodiments, a Bluetooth network is established between audience devices that are brought by audience members to a room in which the presentation occurs, audience devices that are fixed in the room, and presenter device 100. According to these embodiments, the evaluation is received over the Bluetooth network in step S502.

Many types of evaluations may be received in step S502. More specifically, a received evaluation may include one or more of: an indication of an audience member's level of interest in the presentation; an indication of a presenter's level of considerateness; an indication of an audience member's level of comprehension; an evaluation of the presentation's clarity; an evaluation of the presenter's speaking volume; an evaluation of the clarity of presentation materials; an evaluation of the relevance of the presentation; an evaluation of the presentation's pace; an evaluation of the presentation's attractiveness; an evaluation of the presenter's charisma; an evaluation of the presenter's appearance; an evaluation of the presenter's attentiveness to the audience members, an evaluation of the presenter's responsiveness; and an evaluation of the quality of ancillary presentation materials. Of course, the evaluation may include information other than that described above.

A received evaluation may also indicate an audience member or audience device from which it was transmitted. Alternatively, a received evaluation may be anonymous. The received evaluation may also be an aggregate of several evaluations transmitted by audience members. In this case, the evaluations may be aggregated by an audience device, presenter device 100, or any other device in communication therewith.

It is determined in step S503 whether the presenter wishes to respond to the received evaluation. This determination may be made based on whether an input is received from the presenter through input device 140 indicating that the presenter wishes to respond to the received evaluation. In some embodiments, such input is prompted by a query presented to the presenter through display 150 and asking whether the presenter wishes to respond to the evaluation. If it is determined in step S503 that the presenter does not wish to respond, process steps 500 terminate.

Flow proceeds to step S504 if it is determined that the presenter wishes to respond to the evaluation received in step S502. In step S504, the presenter creates a response to the evaluation. The response may be created using input device 140 or by other means, and the response is electronically transmitted to less than all of the audience members in step S505. Again, it should be noted that steps S504 and S505 occur during the presentation.

The response may be electronically transmitted using the connection over which the evaluation was received in step S502, or using another connection. The presenter may indicate that the response should be transmitted to the audience member or audience device from which the evaluation was received. If so, the audience member or audience device is determined from an indication included in the evaluation. Of course, if such an indication is not included in the evaluation (the evaluation is anonymous), it may be impossible to determine the audience member or audience device.

The presenter may indicate that the response be sent to any number or group of audience members, such as all audience members in the last two rows of the room, all audience members on the left side of the room, and all remotely-located audience members. By allowing the response to be electronically transmitted to less than all audience members, process steps 500 allow a presenter to customize a presentation and to more efficiently communicate with audience members during a presentation.

In some embodiments of step S505, the response is transmitted to a third party who is not receiving the presentation and is therefore not an audience member. Such a feature facilitates monitoring of the presentation's progress and the presenter's actions by outside parties, such as a supervisor or administrator.

Figure 6:
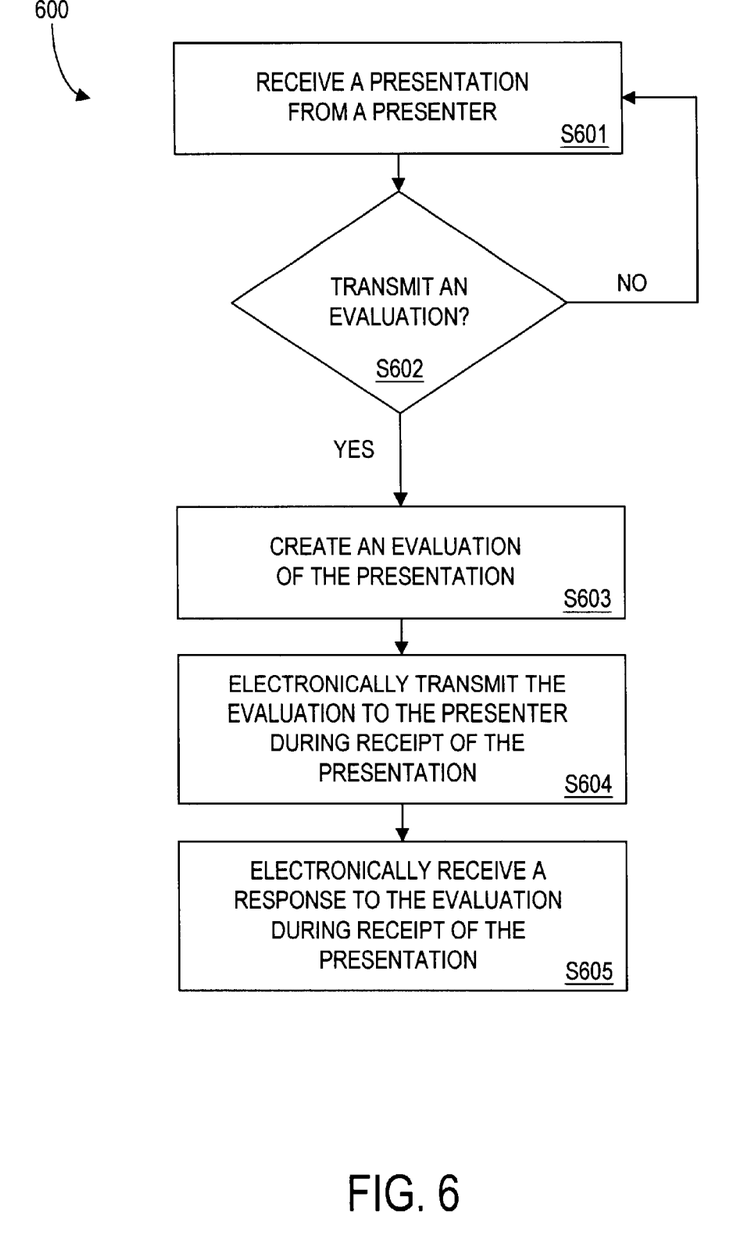
FIG. 6 is a flow diagram of process steps to receive a presentation according to some embodiments of the present invention.

Process steps 600 of FIG. 6 include steps to receive a presentation according to some embodiments of the present invention. Process steps 600 are described herein as being included in audience application 282 and executed by audience device 200. It is contemplated that various ones of process steps 600 may be included in device drivers 284 or other applications and executed by any device or number of devices, and that some of process steps 600 may be performed manually.

Briefly, process steps 600 include steps to receive a presentation from a presenter, and to electronically transmit an evaluation of the presentation to the presenter during the receiving step. By virtue of these steps, an audience member may efficiently provide information to a presenter during a presentation and thereby increase the efficiency of the presentation.

Flow begins at step S601, in which a presentation is received from a presenter by an audience member operating audience device 200. The received presentation may concern any subject matter, may be presented in any manner, and may be presented in any of the environments mentioned above with respect to step S501. It will be assumed that the presentation will continue to be received throughout the remaining steps of process steps 600.

Next, in step S602, it is determined whether an evaluation should be transmitted. This determination may be made based on whether an input is received from the audience member through input device 240 indicating that the audience member wishes to transmit an evaluation. In some embodiments, this input is prompted by a query presented to the audience member through display 250 and inquiring whether the audience member wishes to transmit an evaluation. If it is determined in step S602 that the audience member does not wish to transmit an evaluation, flow returns to step S601. Accordingly, flow cycles between steps S601 and S602 until it is determined in step S602 that the audience member wishes to transmit an evaluation.

Once the determination in step S602 is affirmative, an evaluation is created in step S603. The evaluation may be created by the audience member using input device 240 of audience device 200, and may include any of the elements mentioned above. Next, in step S604, the evaluation is electronically transmitted to the presenter during receipt of the presentation. The transmission may occur over one or more direct or network connections such as those described herein. Again, one or more of the connections over which the evaluation is presented may be established without regard to the evaluation or in response to an indication that the evaluation is to be transmitted.

In step S605, a response to the evaluation is electronically received. The response may be a response transmitted only to audience device 200 or also to other audience devices. In some embodiments, the received response is identical to the response transmitted in step S505 of process steps 500. The response may also be electronically received by the audience member through display of the response by display 250.

In alternative embodiments of step S604, the evaluation is only or also transmitted to a third party who is not receiving the presentation. This alternative allows an audience member to efficiently report on a presentation to a party not present at the evaluation, such as a supervisor or administrator.

Of course, process steps 500 and 600 may be altered to create embodiments of the invention according to any of the alternative arrangements mentioned herein. Moreover, although the present invention has been described with respect to particular embodiments and alternative arrangements thereof, those skilled in the art will note that various substitutions may be made to those embodiments and arrangements without departing from the spirit and scope of the present invention.

What is claimed is:

1. A system comprising:

a presenter device for use by a presenter while presenting a presentation to a plurality of audience members; and a plurality of audience devices in communication with the presenter device, wherein, during the presentation, one of the plurality of audience devices transmits an evaluation of the presentation to the presenter device, and wherein, during the presentation, the presenter device transmits a response to the evaluation to only the one of the plurality of audience devices.

2. A system comprising:

a presenter device for use by a presenter while presenting a presentation to a plurality of audience members; and a plurality of audience devices in communication with the presenter device, wherein, during the presentation, one of the plurality of audience devices transmits an evaluation of the presentation to the presenter device, and wherein the plurality of audience devices are in communication with the presenter device over a network, the network comprising at least one of the Internet, a Bluetooth network, and an I.E.E.E. 802.11 wireless network.

3. An apparatus comprising:

a processor; and a storage device in communication with said processor and storing instructions adapted to be executed by said processor to:

present a presentation to a plurality of audience members;

electronically receive an evaluation of the presentation during the presenting step; and electronically transmit a response to the evaluation to only one of the plurality of audience members.

4. An apparatus comprising:

a processor; and a storage device in communication with said processor and storing instructions adapted to be executed by said processor to:

present a presentation to a plurality of audience members; and electronically receive an evaluation of the presentation during the presenting step, wherein the evaluation is electronically received over a network, the network comprising at least one of the Internet, a Bluetooth network, and an I.E.E.E. 802.11 wireless network.

5. An apparatus comprising:

a processor; and a storage device in communication with said processor and storing instructions adapted to be executed by said processor to:

receive a presentation from a presenter;

electronically transmit an evaluation of the presentation to the presenter during the receiving step; and electronically receive a response to the evaluation from the presenter during the receiving step.

6. An apparatus comprising:

a processor; and a storage device in communication with said processor and storing instructions adapted to be executed by said processor to:

receive a presentation from a presenter; and electronically transmit an evaluation of the presentation to the presenter during the receiving step, wherein the evaluation is electronically transmitted over a network, the network comprising at least one of the Internet, a Bluetooth network, and an I.E.E.E. 802.11 wireless network.

7. A system comprising:

a presenter device for use by a presenter while presenting a presentation to a plurality of audience members; and a plurality of audience devices in communication with the presenter device, wherein, during the presentation, the presenter device transmits data to less than all of the plurality of audience devices, and wherein the data is transmitted over a network, the network comprising at least one of the Internet, a Bluetooth network, and an I.E.E.E. 802.11 wireless network.

8. A medium storing processor-executable process steps, the process steps comprising:

a step to present a presentation to a plurality of audience members;

a step to electronically receive an evaluation of the presentation during the presenting step; and a step to electronically transmit a response to the evaluation to only one of the audience members during the presenting step.

9. A medium storing processor-executable process steps, the process steps comprising:

a step to receive a presentation from a presenter;

a step to electronically transmit an evaluation of the presentation to the presenter during the receiving step; and a step to electronically receive a response to the evaluation from the presenter during the receiving step.

10. A method, comprising:

presenting a presentation to a plurality of audience members;

electronically receiving an evaluation of the presentation during the presenting step; and electronically transmitting a response to the evaluation to only one of the audience members during the presenting step.

11. A method comprising:

receiving a presentation from a presenter;

electronically transmitting an evaluation of the presentation to the presenter during the receiving step; and electronically receiving a response to the evaluation from the presenter during the receiving step.

* * * * *